A. B. WESTRUP.
KITCHEN UTENSIL.
APPLICATION FILED JUNE 3, 1908.

899,365.

Patented Sept. 22, 1908.

Witnesses:
Joe. P. Wahler
K. Allen

Inventor,
Alfred B. Westrup.
Victor J. Evans,
Attorney

UNITED STATES PATENT OFFICE.

ALFRED BENBOW WESTRUP, OF HABANA, CUBA.

KITCHEN UTENSIL.

No. 899,365.

Specification of Letters Patent.

Patented Sept. 22, 1908.

Application filed June 3, 1908. Serial No. 436,503.

*To all whom it may concern:*

Be it known that I, ALFRED BENBOW WESTRUP, a citizen of the United States, residing at Habana, in the Province of Habana and in the Island of Cuba, have invented new and useful Improvements in Kitchen Utensils, of which the following is a specification.

This invention relates to kitchen utensils, and the object of the invention is to provide a device adapted for the scraping and cleaning of pots, kettles, pans, and the like; the device being constructed of rubber or other suitable resilient material whereby all crevices of the pots or pans may be reached and easily scraped and cleaned.

To these ends the invention resides in the novel construction of kitchen utensils hereinafter fully described and claimed.

Figure 1:
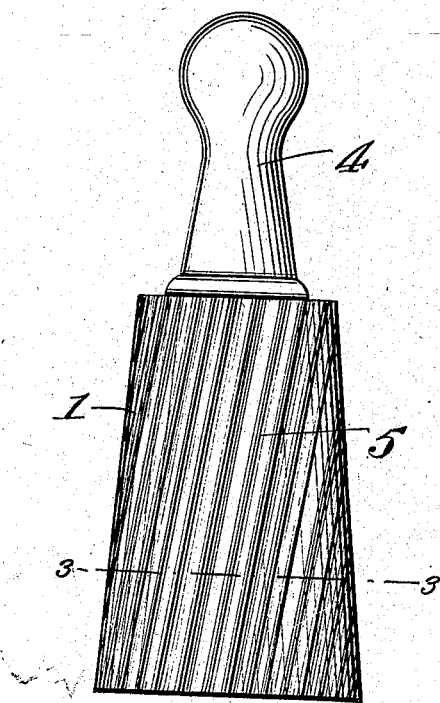
Figure 2:
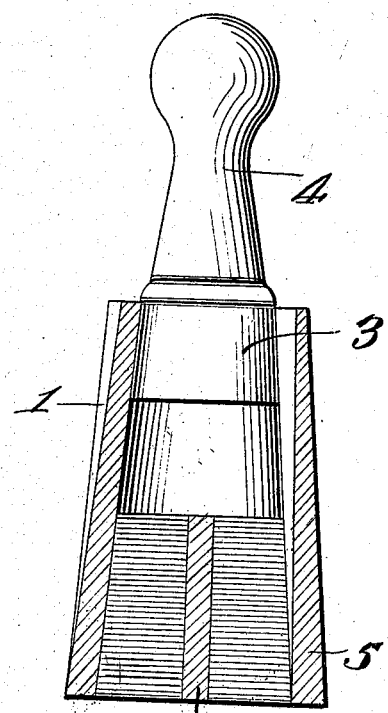
Figure 3:
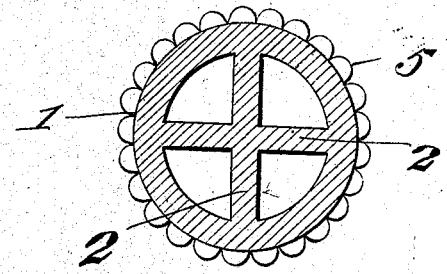

In the drawings, Figure 1 is a side elevation of the device constructed in accordance with my invention. Fig. 2 is a central longitudinal section of the same. Fig. 3 is a horizontal section upon the line 3—3 of Fig. 1.

In the drawings the numeral 1 designates the body of my improved utensil. The body of my device is preferably constructed of rubber, of a suitable toughness to retain its shape, and at the same time be sufficiently resilient to contact with the creases or crevices of an ordinary pot or pan. The body of my device is preferably hollow in construction, and is supported upon its lower end with a suitable reinforcement 2, while its upper end is reinforced by the extending portion 3 of a handle 4. The reinforcement 2 is preferably formed integral with the body of the device, and comprises a pair of arms or walls connected at their center and extending at right angles towards the inner face of the body 1, thus forming spaces between the sides of the walls and the inner face of the body to allow the water accumulated within the body, when the device is manipulated, to be readily drawn therefrom. The body 1 is preferably frusto-conical in formation and its perimeter is provided with a series of radiating ribs or corrugations 5. With a kitchen utensil of this character it will be readily seen that the device will adapt itself to the various creases and crevices of a pot or pan, and that the reinforcements provided by the handle and the elements 2, the device is normally retained in an upright position and prevented from creasing or depression.

Having thus fully described the invention what is claimed as new is:

1. A pot cleaner comprising a hollow resilient body portion, radiating ribs upon the perimeter of the body, a handle upon the upper portion of the body, and a reinforcement upon the lower portion of the body, said reinforcement comprising a pair of arms or walls connected at their center and extending at right angles toward the inner face of the body.

2. A pot cleaner comprising a hollow resilient body portion, radiating ribs upon the perimeter of the body, a handle upon the upper portion of the body and a reinforcement upon the lower portion of the body.

3. A pot cleaner comprising a body of resilient material, being hollow in formation and having ribs upon its perimeter, a handle having an extension engaging the inner periphery of the hollow body, and a reinforcement engaging the inner periphery of the lower portion of the body.

In testimony whereof I affix my signature in presence of two witnesses.

ALFRED BENBOW WESTRUP.

Witnesses:
VICTOR NORMAND,
A. ROGERS.